Figure 2:
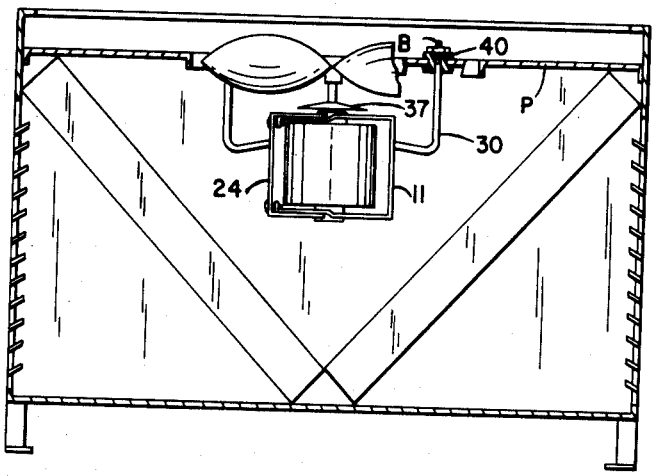

Sept. 14, 1965  R. C. LONGSWORTH  3,206,148
MOTOR MOUNTING MEANS
Original Filed Dec. 15, 1961

INVENTOR.
RALPH C. LONGSWORTH.
BY

ATTORNEY.

United States Patent Office 3,206,148
Patented Sept. 14, 1965

3,206,148
MOTOR MOUNTING MEANS
Ralph C. Longsworth, Syracuse, N.Y., assignor to Carrier Corporation, Syracuse, N.Y., a corporation of Delaware
Original application Dec. 15, 1961, Ser. No. 159,632. Divided and this application Feb. 25, 1965, Ser. No. 444,484
3 Claims. (Cl. 248—18)

This application is a division of copending application, Serial No. 159,632, filed December 15, 1961, for "Motor Mounting Means."

This invention relates to air conditioning, more particularly to motor mounts for the fan motors utilized in air conditioning systems.

As is the case with all motor mountings, so particularly in the case of air conditioning installations, it is desirable to provide a motor mount which will serve to securely support the motor in operative position during shipment and normal use; and at the same time isolate the motor so that vibrations of the other equipment will not be transmitted thereto, and similarly vibrations of the motor will not be transmitted to the other equipment. Where a motor is employed for driving a fan, maximum efficiency is obtained by utilizing a common fan shaft and motor shaft. This requires that the motor be maintained in alignment with the fan so as to minimize bearing wear and so as to obtain maximum fan efficiency. Where fans and fan motors are factory assembled with the other components of air conditioning equipment, production efficiency and economy results. If during shipment of the assembled air conditioning equipment from the factory to the site of installation, the fan motor is shocked or jolted out of alignment, as may readily occur in normal shipping procedures, there is a resultant loss of the economies attained by factory production.

A further problem is encountered in providing a motor mount for a fan drawing air along a vertical axis. In an air conditioning installation, a horizontally positioned orifice panel requires that the fan rotate about a vertical axis, and, where the motor is suspended from the orifice panel, provision of the necessary blade clearance between the motor mount and the blades is often a problem.

It is with the above desiderata and problems in mind that the present means have been evolved, means providing a motor mount which serves to support the motor securely in a fixed, aligned, and balanced position, and in isolation so that motor vibrations and shock loads are not transmitted to the other components of the equipment and vice versa. Additionally vertical fan mounting is attainable with necessary fan blade clearance.

It is accordingly a primary object of this invention to provide an improved motor mount.

Another object of this invention is to provide an improved fan motor mount for use in conjunction with air conditioning equipment.

An additional object of the invention is to provide a motor mount for supporting a fan motor in combination with a horizontal orifice panel.

It is also an object of this invention to provide an improved fan motor mount which will serve to support the fan motor in an aligned balanced orientation with respect to the fan and the other components of the equipment.

A further object of the invention is to provide a fan motor mount permitting the fan to rotate about a vertical axis.

Another object of the invention is to provide a motor mount capable of accommodating differently dimensioned motors.

An additional object of the invention is to provide a motor mount serving to support a motor in vibration free isolation.

These and other objects of the invention which will become hereafter apparent are attained by forming the motor mount of two channel shaped bracket members oriented with the channel openings facing each other and with the channel legs securable with respect to each other to permit the channels to be joined. Suitable fastening members are provided for joining the channels in a fixed position with respect to the motor. A novel supporting bar having a mounting arm, a spring arm, and an engaging arm is secured to the channel members to support same. In use, the positioning of a motor in the support formed by the telescoping channels, and the mounting of the channel enclosed motor by the supporting bar serves to maintain the motor in balanced alignment and vibration free isolation, with the spring arm providing needed fan blade clearance.

An important feature of the invention resides in the formation of the supporting bar with a spring arm or leg structure between the mounting leg or arm and engaging leg or arm so as to provide desired flexibility of support and additionally providing fan blade clearance.

Another important feature of the invention resides in the fact that the channel brackets in assembled relationship form a flat top surface which enables a slinger ring on the motor shaft to keep water out of the top bearing of the motor thus eliminating the need for a drip cover in vertical motor installations.

Figure 1:
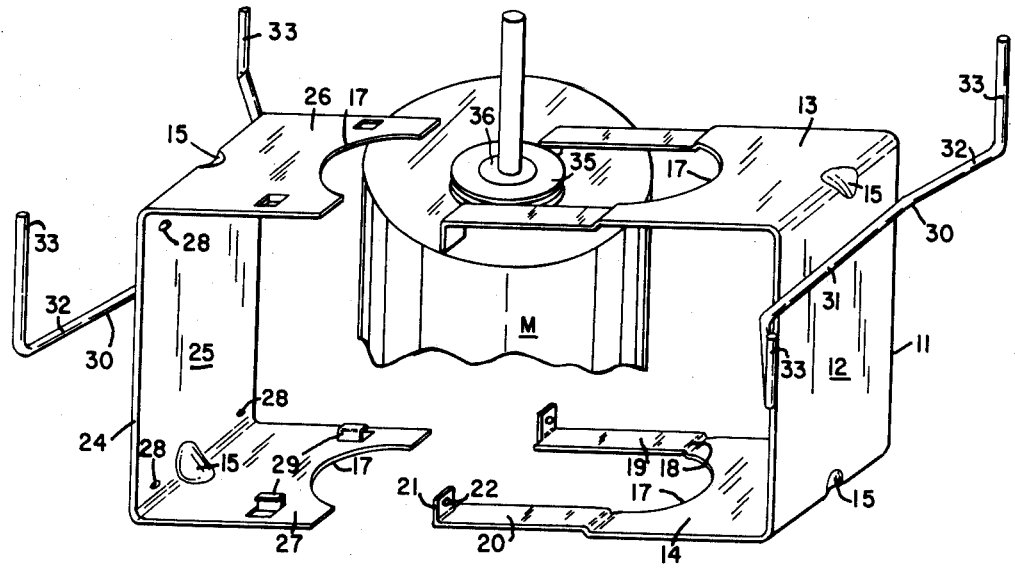

The specific details of two embodiments of the invention and their mode of functioning, will be made most manifest in clear, concise and exact terms in conjunction with the accompanying drawings, wherein:

FIG. 1 is an exploded perspective view of a motor shown in position prior to assembly with one embodiment of the novel motor mount; and FIG. 2 is a front elevational view of the novel motor mount of FIG. 1.

Referring now more particularly to the drawings, like numerals in the various figures will be employed to designate like parts.

In the embodiment of the invention illustrated in FIGS. 1 and 2, a first channel shaped bracket member 11, as seen to the right in the drawings, is formed with a base 12 and opposed legs 13 and 14 extending at right angles to the base on the same side thereof. Reinforcing tooling 15 is employed to strengthen the channel structure along the line of intersection between the legs and the base. A semicircular cutout 17 having a diameter substantially equal to that of the collar of the motor housing is formed in each of the legs of the channel. From offsets 18, extending in the same direction as the legs 13 and 14 in a plane slightly displaced therefrom, are a pair of spaced telescoping fingers 19 and 20, one pair joined to each leg 13 and 14 immediately adjacent the end of the semi-circular cutout 17. Securement flanges 21 are formed at the end of each finger, and bolt holes 22 are formed therein.

A second channel shaped bracket member 24 as seen to the left in the drawing comprises a base 25 and opposed legs 26 and 27 similar to legs 13 and 14 respectively of first channel shaped bracket 11. Bolt holes 28 adapted for alignment with bolt holes 22 are formed in base 25 of bracket 24. Tracks 29 are formed by stamping legs 26 and 27. These tracks are shaped apart to accommodate fingers 19 and 20 in the assembled mount, as will become hereinafter more apparent. The semi-circular cutouts 17 are formed similar to those on legs 13 and 14. The spacing between legs 26 and 27 is equal to the spacing between legs 13 and 14 so that when the brackets are assembled into the operative relationship shown in FIG. 2, a flush surface is formed between the exterior portions of legs 27 and 14, and legs 26 and 13, respectively.

Secured by welding, or any other suitable fastening means, to the inside or outside of bases 12 and 25 respectively are supporting bars 30. Each supporting bar 30 has an engaging arm 31 secured to the base of the bracket member, a downwardly and outwardly extending spring arm 32 on each end of said engaging arm; and an upwardly extending mounting arm 33 formed at the extremities of the spring arms 32. The free ends of mounting arms 33 are threaded to receive bolts suitable for anchoring of the assembled mount of a support element, which in the case of an air conditioning installation will be an orifice panel.

The motor M which is to be supported by the novel mount is provided with a grooved resilient ring 35 about the motor housing collar 36, ring 35 adapted to lie within cutout 17 in the assembled mounted motor. It will be understood that a ring 35 is arranged at each end of the motor housing for receipt within cutout 17 at both ends of the motor.

In the assembled mounted motor a slinger ring 37 formed of plastic or the like is secured to the motor shaft above the top legs 14 and 27 respectively of the mount brackets to dispel any moisture which may otherwise drip down into the motor bearing.

In use, the aforedescribed components are assembled into the operative structure illustrated in FIG. 2. The motor is arranged so that the rings 35 lie cradled within cutouts 17. The rings 35 will be understood to be made of a suitable shock absorbing resilient material. The mounting brackets 11 and 24 are assembled by drawing legs 26 and 27 over the surface of fingers 19 and 20 sliding fingers 19 and 20 outside tracks 29. Suitable fastening bolts are extended through bolt holes 28 and openings 22 and have nuts applied thereto to secure the parts against separation. If desired, self-tapping sheet metal screws may be employed for the same purpose.

The entire assembly is held in operative position with respect to any air conditioning installation by securing the mounting arms 33 of the supporting bar to an appropriate supporting surface. In most installations this will be the orifice panel P of the fan.

Appropriate resilient washers 40 may be employed about the threaded ends of the mounting arms 33 between the bolt B and the panel P as best seen in FIG. 2. It will be observed that spring legs 32 serve the twofold function of providing resilience for the mount to take up any transmitted shock load, and simultaneously permit the necessary clearance for the fan blades.

It is thus seen that a simple, inexpensive, readily assembled motor mount has been provided adapted particularly for an air conditioning installation in which necessary fan blade clearance is provided, and motor alignment and balance may be obtained, with the motor maintained in vibration free isolation.

While I have described a preferred embodiment of the invention, it will be understood the invention is not limited thereto since it may be otherwise embodied within the scope of the following claims.

I claim:
1. A fan motor mount comprising: a first channel shaped bracket member; an interior sliding telescope surface at the free ends of the legs of said channel shaped bracket member; a second channel shaped bracket member; a sliding overlying telescope surface on the legs of said second bracket member adapted to lie in superposed telescoping position with respect to said surfaces on said first bracket member; a first supporting bar secured to said first channel shaped bracket member, said supporting bar having an engaging arm secured to said first channel shaped bracket member, a spring arm on said supporting bar extending outwardly from each end of said engaging arm, and a mounting arm extending from said spring arm for engagement by a supporting surface; a second supporting bar having arms like said first supporting bar secured to said second channel shaped bracket member.

2. A fan motor mount as in claim 1 in which said interior sliding telescope surface comprises: two spaced fingers separated a distance such as to accommodate the motor housing shaft collar.

3. A fan motor mount as in claim 1 in which said interior sliding telescope surface is inset from the channel legs, whereby the legs of said first bracket lie flush with the legs of said second bracket.

References Cited by the Examiner
UNITED STATES PATENTS

| | | | |
|---|---|---|---|
| 2,206,463 | 7/40 | Jewell | 248—18 |
| 2,386,503 | 10/45 | Pressley | 248—18 |
| 2,620,970 | 12/52 | Palmer et al. | 230—250 |
| 2,673,699 | 3/54 | Johnson | 248—14 |

CLAUDE A. LE ROY, *Primary Examiner.*